United States Patent [19]

Foti

[11] Patent Number: 5,478,121
[45] Date of Patent: Dec. 26, 1995

[54] CONNECTOR FOR GAS APPLIANCES

[75] Inventor: Sam J. Foti, Lyndhurst, Ohio

[73] Assignee: Hose Master, Inc., Cleveland, Ohio

[21] Appl. No.: 161,971

[22] Filed: Dec. 6, 1993

[51] Int. Cl.$^6$ .................................................. F16L 27/00
[52] U.S. Cl. ........................ 285/163; 285/119; 285/168; 137/613
[58] Field of Search ....................... 285/163, 164, 285/168, 181, 119, 272, 149; 137/613

[56] References Cited

U.S. PATENT DOCUMENTS

| | | | |
|---|---|---|---|
| 1,044,644 | 11/1912 | Greenlaw | 285/163 X |
| 1,393,987 | 10/1921 | Wampler . | |
| 1,928,279 | 9/1933 | Bard . | |
| 2,026,167 | 12/1935 | Guarnaschelli . | |
| 2,412,394 | 12/1946 | Giles . | |
| 2,501,639 | 3/1950 | Warren . | |
| 2,509,119 | 5/1950 | Warren | 285/168 |
| 2,587,938 | 3/1952 | Warren . | |
| 2,712,456 | 7/1955 | McCreery . | |
| 2,745,682 | 5/1956 | Chevallier . | |
| 2,948,306 | 8/1960 | Kuraeff . | |
| 3,141,473 | 6/1964 | Mejyr . | |
| 3,166,252 | 1/1965 | O'Brien et al. | 285/168 X |
| 3,200,807 | 8/1965 | Culligan . | |
| 3,558,163 | 1/1971 | Moore et al. . | |
| 3,620,268 | 11/1971 | Paddington et al. . | |
| 3,858,601 | 1/1975 | Ensigner . | |
| 3,900,221 | 8/1975 | Fouts . | |
| 4,111,465 | 9/1978 | Knight . | |
| 4,611,834 | 9/1986 | Rabinovich | 285/168 X |
| 4,615,547 | 10/1986 | Sutcliffe et al. . | |
| 5,056,563 | 10/1991 | Glossop | 285/163 X |
| 5,178,422 | 1/1993 | Sekerchak . | |
| 5,383,492 | 1/1995 | Segal | 137/613 |

FOREIGN PATENT DOCUMENTS

| | | |
|---|---|---|
| 528162 | 7/1956 | Canada . |
| 0746015 | 5/1933 | France . |
| 0963720 | 7/1950 | France . |
| 0589273 | 11/1933 | Germany . |
| 224919 | 8/1925 | United Kingdom .................. 285/168 |

OTHER PUBLICATIONS

Undated pages from a Wedgon Petroleum Swivels catalog showing various fittings.
Undated Hose Master, Inc. brochure entitled "Appliance Connectors."

Primary Examiner—Terry Lee Melius
Assistant Examiner—Heather Chun Shackelford
Attorney, Agent, or Firm—Watts, Hoffmann, Fisher & Heinke Co.

[57] ABSTRACT

A connector for delivering combustion gas to a gas fired appliance from a stationary supply line where the appliance moves toward and away from the supply line with the connector straightening and flexing between them as the appliance moves. The connector comprises a flexible hose assembly and first and second swivel fittings at respective hose assembly ends. The first and second swivel fittings have respective end walls defining between them the maximum overall connector length. Each swivel fitting comprises a swivel member for communicating the connector with the appliance or the supply line. The swivel members each define a gas flow path and swivel axis extending therethrough with each axis extending parallel to a respective adjacent swivel fitting end wall and each end wall rotatable relative to the swivel member about the axis.

11 Claims, 6 Drawing Sheets

CONNECTOR FOR GAS APPLIANCES

FIELD OF THE INVENTION

The present invention relates to connectors for delivering gas to commercial gas fired appliances and more particularly to flexible connectors which enable moving the appliances for cleaning and maintenance without disconnecting the gas supply.

BACKGROUND OF THE INVENTION

Commercial gas fired appliances, such as fryers, ranges and stoves, used in restaurants and other commercial and institutional kitchens, must be moved frequently to permit cleaning beneath and behind them as well as for enabling maintenance, repairs and inspections. Appliances are equipped with casters to facilitate movement.

Connectors for delivering gas to commercial gas fired appliances have been constructed to permit movement without disconnecting the gas supply lines. One proposal was to construct the connector from lengths of rigid pipe connected together by relatively rotatable sealed swivel joints so that the pipe assembly was flexed and straightened and the appliance moved toward and away from its normal operating location.

Even though the pipe assemblies were capable of flexure during appliance movements the assemblies rigidly resisted movements in certain directions. When appliances turned during movement, bending and wrenching moments were exerted on the pipes and the swivel joints.

Flexible connectors have been proposed to enable turning the appliances while moving them to and away from their operating positions. Flexible connectors have been fashioned from flexible metal hoses and associated fittings for securing the hose ends to the appliances and the supply lines. Such connectors were flexed when the appliance was in its operating position and straightened out to permit moving the appliance from the operating position. The connectors were flexible enough to permit the appliance to turn or shift laterally relative to its operating position if desired.

Where the connector ends were rigidly fixed to the supply line and the appliance, tensioning the connector could damage the metal hose. Flexible metal hoses could be kinked and ruptured when the associated appliance was moved too far or too much force was applied. Kinking was a particular problem if an appliance was roughly pulled from its operating position to a location where the connector was taut and highly tensioned. Safety tethers were employed to limit the appliance travel from its normal location and prevent tautening the connectors, but tethers were not always effective.

A proposal has been made to provide triaxial swivel assemblies at the ends of the connectors. It was thought that these connector ends could be secured to the supply line and appliance in so that the hose could not kink. The theory was that the swivel assemblies would enable the opposite hose ends to align when the connector was straightened. U.S. Pat. No. 5,178,422 issued Jan. 12, 1993 discloses this proposal.

There were drawbacks to the '422 patent proposal. In the first place, the overall gas connector length is prescribed by industry regulations and includes the swivel assemblies. These assemblies were relatively long. Each included three separate members. To insure against kinking either hose end, a swivel assembly had to be placed at each connector end. Because the total swivel assembly length was great, the hose length had to be diminished proportionately.

The three axis swivel assemblies functioned relatively well except when all the axes in one, the other, or both swivel assemblies were substantially aligned in the same plane with the direction of applied hose force. Then the swivel assembly was unable to swivel (or "locked up") as the appliance moved away from its operating position. The normal position for each swivel assembly when the appliance was in its operating position was fully extended, hanging straight down with the hose positioned to pull in a generally horizontal direction. Conditions were thus ripe for swivel assembly lock up to occur.

During lock up, the swivel assembly was placed in bending stress as the applied hose force increased. The swivel assembly frictional forces resisting swiveling increased as hose force increased. Swiveling was even less likely to occur as appliance movement continued. Since the locked up swivel assemblies were long, the appliance could not reach its accustomed location when it was pulled out for cleaning.

The appliance could not move to its cleaning position even with the hose itself fully extended and in tension. Furthermore, because the locked up swivel assembly length was great, the safety tether could be slack when the hose was in tension. In these circumstances it was possible for cleaning personnel to try to force the appliance to its normal cleaning position, damaging the hose or a swivel assembly, or both.

Alignment of the swivel assembly axes with the hose pull direction did not occur every time the appliance was moved; but lock up did occur with sufficient frequency to create a problem. The swivel assembly rest position (illustrated in the '422 patent when the appliance was in the operating position) was with all the axes aligned. Moreover, because of swivel joint friction, the axes and hose pull direction did not have to be perfectly aligned for lock up to occur. This factor contributed to the lock up frequency.

The present invention provides a new and improved gas appliance connector wherein a hose assembly and associated swivel fittings are constructed and arranged to maximize the hose length compared to the overall connector length, insure against swivel fitting lockup and attendant hose kinking and yet are uncomplicated and ruggedly constructed.

DISCLOSURE OF THE INVENTION

The present invention provides a connector for delivering combustion gas to a gas fired appliance from a stationary supply line. The appliance moves toward and away from the supply line with the connector straightening and flexing between them as the appliance moves. The connector comprises a flexible hose assembly and first and second swivel fittings at respective hose assembly ends. The first and second swivel fittings have respective end walls defining between them the maximum overall connector length. Each swivel fitting comprises a swivel member for communicating the connector with the appliance or the supply line. The swivel members each define a gas flow path and swivel axis extending therethrough with each axis extending parallel to a respective adjacent swivel fitting end wall and each end wall rotatable relative to the swivel member about the axis.

In the preferred embodiment the first swivel fitting is connected to the supply line and comprises a body and a swivel member, the body has a first body end proximal the supply line and a second body end proximal and connected to one hose assembly end. The first body end and the swivel member define openings surrounding the gas flow path.

The swivel member and the first body end are sealingly engaged and relatively rotatable with respect to each other about a first axis extending through the openings and the gas flow path. The swivel member projects from the first body end for receiving gas from the supply line. The second body end extends toward the hose assembly and defines an opening surrounding the gas flow path and a second axis extending through the second body end opening. The second axis extends transverse to the first axis so that the second axis is rotatable in a plane extending transverse to the first axis.

The second swivel fitting is connected to the appliance and comprises a second body and a second swivel member. The second body has a first body end proximal the appliance and a second body end proximal to the other hose assembly end. The first end of the second body defines an opening surrounding a gas flow path, the second swivel member defines an opening surrounding the gas flow path.

The second swivel member and the first end of the second body are sealingly engaged and relatively rotatable with respect to each other about a third axis extending through the openings and the gas flow path. The swivel member projects from the first end of the second body for delivering gas to the appliance. The second end of the second body extends toward connection with the hose assembly and defines an opening surrounding the gas flow path and a fourth axis extending through the second end opening of the second body.

Other features and advantages of the invention will become apparent from the following detailed description of a preferred embodiment made with reference to the accompanying drawings which form part of the specification.

PRIOR ART

Figure 1:
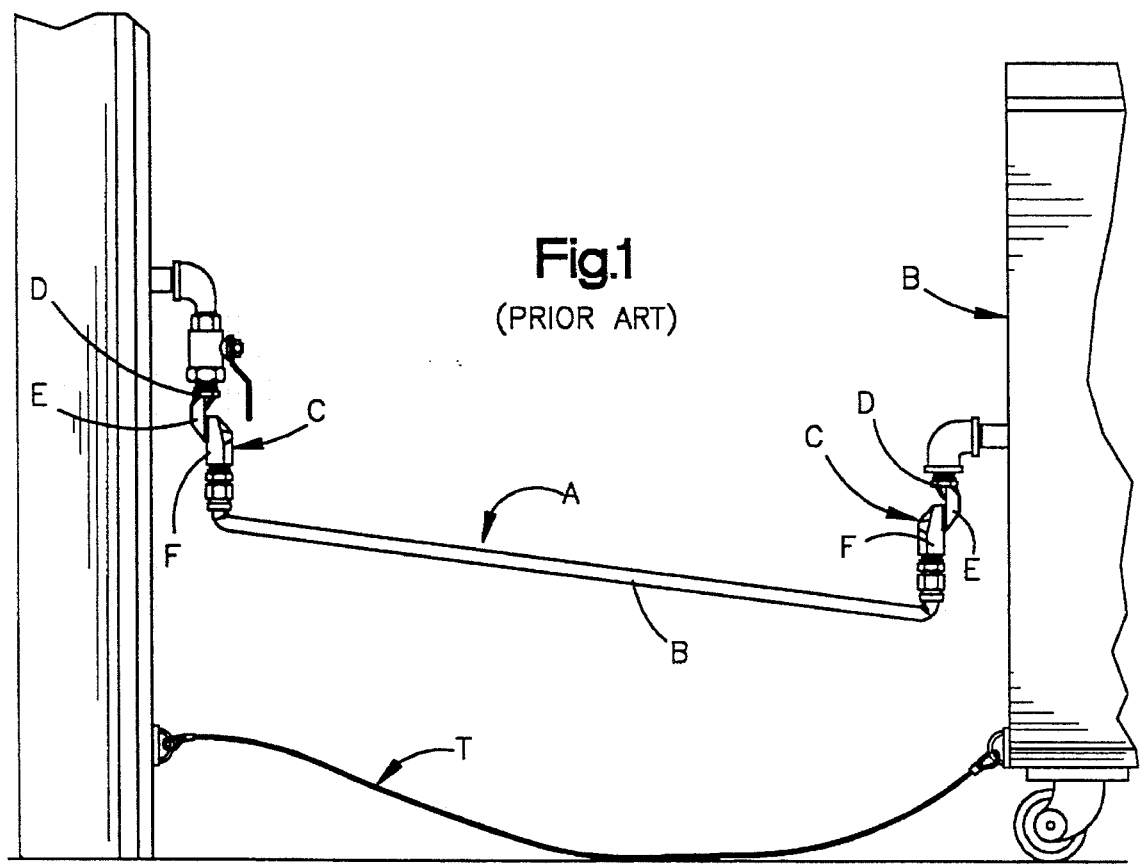
FIG. 1 is a fragmentary elevational view of a prior art connector installed for delivering gas to a commercial cooking appliance, shown with the appliance moved toward a position permitting cleaning behind it.

A conventional connector A for delivering gas from a supply line to a commercial cooking range B is illustrated by FIG. 1 of the drawings. The range B is equipped with casters to facilitate its movement and is normally positioned next to a wall. The range is pulled away from the wall to enable cleaning behind and beneath it. The connector A straightens from its normal, flexed condition as the range moves. A safety tether T attached between the wall and range is intended to prevent the connector from being over tensioned.

The connector A includes a flexible hose assembly B and swivel assemblies C for attaching the connector to the range and to the supply line. The swivel assemblies C are constructed with three separate swivel members D,E,F defining three distinct axes. The multipart swivel assemblies C are of a type often employed with hoses used to fill automotive vehicle gasoline tanks. This swivel assembly construction is intended to produce a high degree of articulation so that the hose assembly is not kinked and damaged when the appliance is moved away from its normal location.

When the connector A is in its normal, flexed condition the swivel assemblies C are gravity biased to hang vertically downwardly, fully extended and aligned with the flexed hose assembly. In this position, the axes of each swivel assembly are substantially aligned in a vertical plane. When these axes and the direction of pull exerted by the hose assembly as it straightens are all aligned, the swivel assembly locks up in its fully extended condition. Locked up swivel assemblies do not articulate. Swivel assembly lock-up does not occur each time the range is moved. It occurs once in a while, unexpectedly.

Because the three member swivel assemblies are relatively long, when one or both of them locks up in the aligned vertical position the length of range travel away from the wall is materially shortened. Cleaning personnel attempting to move the range may assume the movement limitation is due to an obstruction and pull violently on the range. This can kink and damage the hose, as illustrated in FIG. 1.

It should be noted that the hose assembly might be damaged even though the protective tether is in place. This is because the aggregated length of the locked swivel assemblies significantly shortens the extent of the range travel compared to the travel expected when the swivel assemblies articulate. When the tether length exceeds the hose length between the locked swivel assemblies the tether will not protect against kinking.

BEST KNOWN MODE FOR CARRYING OUT THE INVENTION

Figure 2:
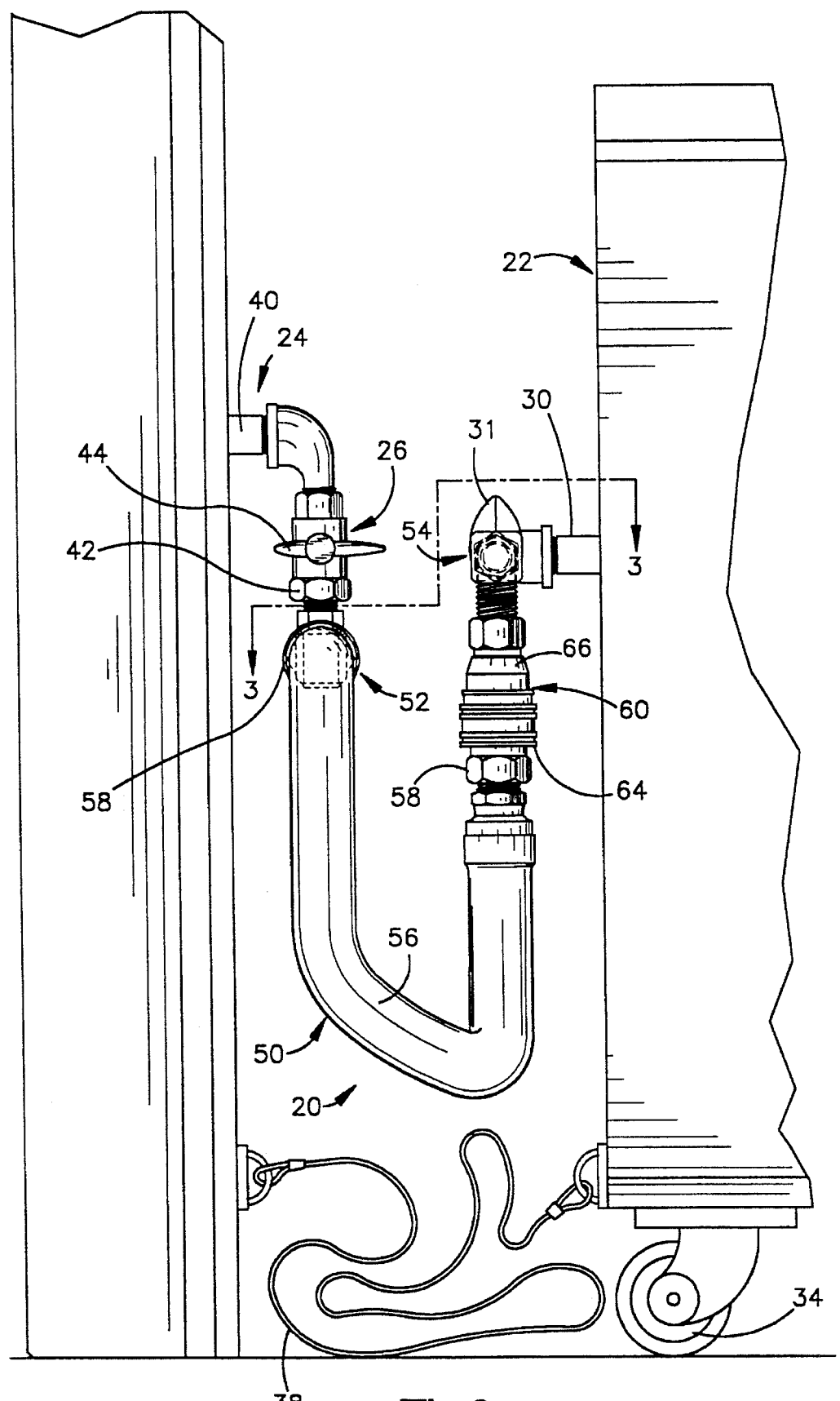
FIG. 2 is a fragmentary elevational view of a connector constructed according to the invention installed for delivering gas to a commercial cooking range with the range in its normal operating location.
Figure 4:
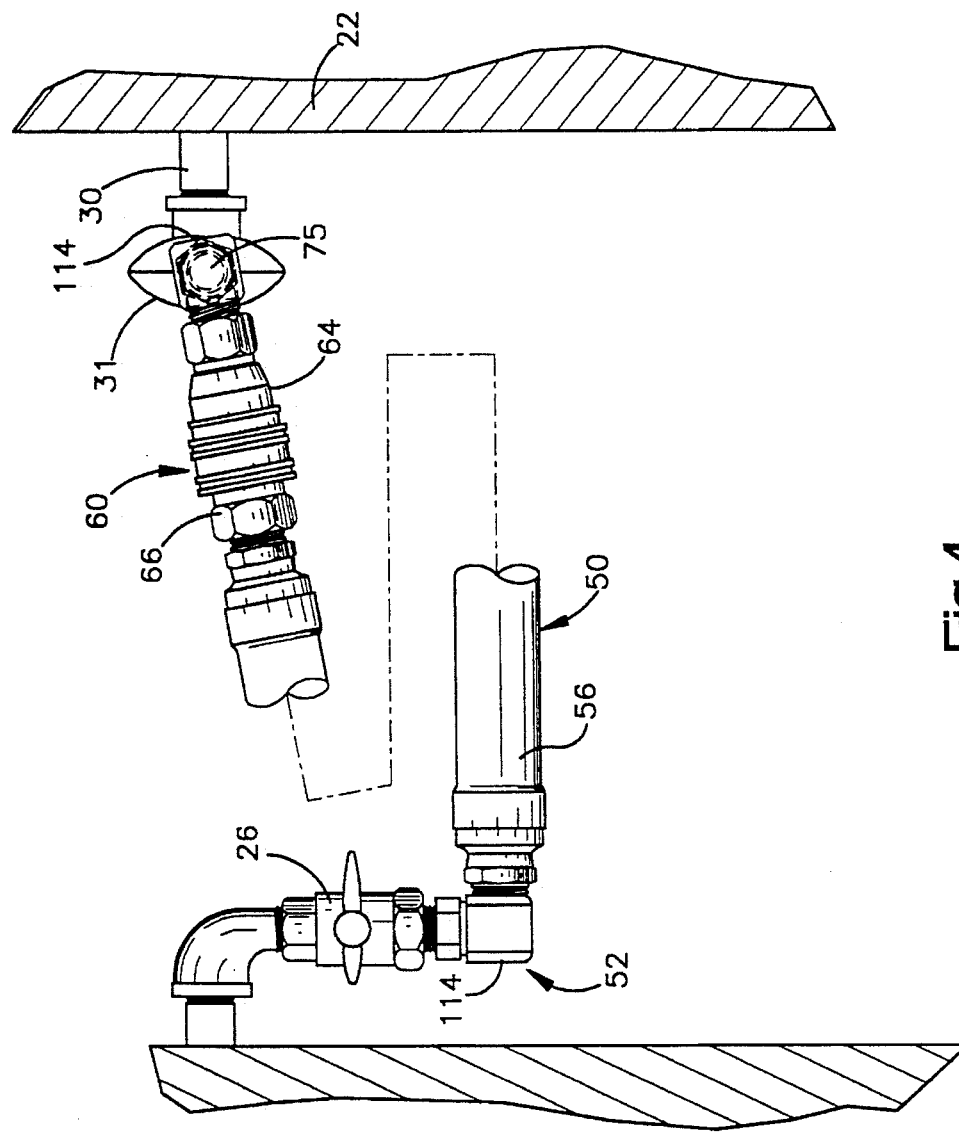
FIG. 4 is a view similar to FIG. 2 with the range moved to its normal cleaning location with portions broken away and illustrated foreshortened.
Figure 3:
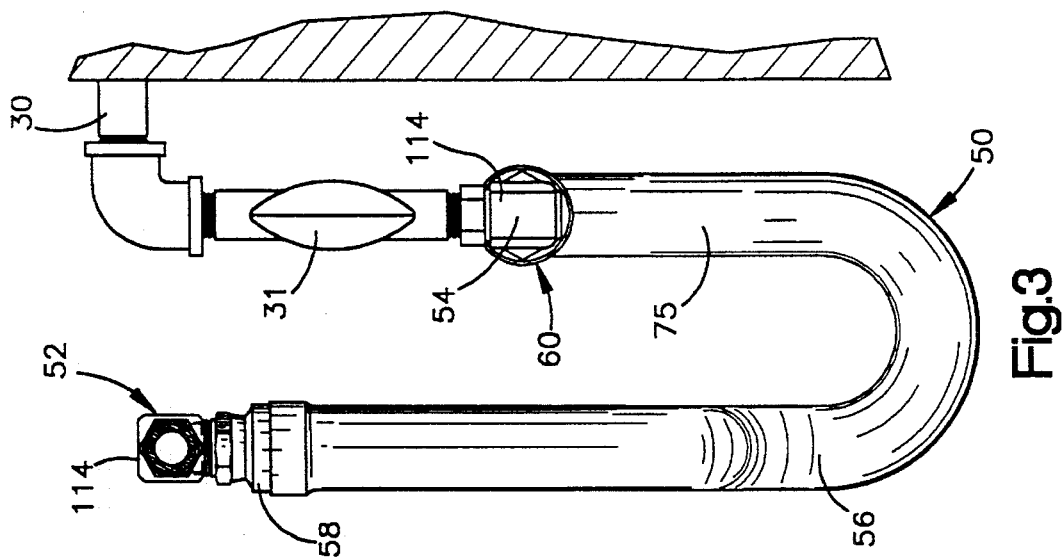
FIG. 3 is a fragmentary cross sectional view seen approximately from the plane indicated by the line 3—3 in FIG. 2.

A flexible connector 20 constructed according to the present invention is illustrated in FIGS. 2–4 for delivering combustion gas to a commercial cooking range 22 from a stationary gas supply line 24. The supply line 24 is conventional and illustrated as supported by a wall and having a manual shut-off valve 26 at the line terminus nearest the connector 20.

The range 22 may be of any suitable or conventional construction and is illustrated as including a gas inlet line 30 projecting from and extending horizontally parallel to the back of the range and a pressure regulator 31 attached to the line 30. The regulator defines a threaded receptacle by which it is connected to the connector 20. The range 22 is normally positioned adjacent the wall when in use, with the connector 20 in a flexed condition between the wall and the range.

Institutional kitchens must be cleaned frequently. The range 22 is movable away from the wall to facilitate cleaning beneath and behind it, as well as to enable servicing and maintenance as necessary. Casters 34 permit relatively easy manual range movement toward and away from the normal position adjacent the wall even though the range may be quite massive. The connector 20 is designed to maintain the range 22 connected to the gas supply line 24 during the temporary range displacement. As the range moves away from the wall the connector 20 straightens out from its flexed condition.

A safety tether 38 attached between the wall and the range limits the range travel. The tether prevents the connector 20 from completely straightening and becoming over tensioned. The tether 38 is preferably formed by a sheathed cable extending between eyes fixed in the wall and the appliance with a length adjusting cable clamp (not illustrated) disposed between its ends.

Although safety tethers are required to be used with commercial cooking appliances to prevent over tensioning gas connectors, they are neither always present nor always effective. Sometimes when tethers are present they are too long to assure connector slack. Thus preclusion of kinking and damage to connectors can not be assumed because tethers are required.

The illustrated supply line 24 comprises a supply conduit (not shown) having a supply pipe 40 branching toward the range 22. The shut-off valve 26 is screwed on to the projecting supply pipe end via a pipe elbow. The supply conduit is located within the wall behind the range in the illustrated embodiment of the invention. The supply conduit may alternatively extend along the wall outer surface supported by suitable pipe hangers.

The manual shut-off valve 26 is mounted adjacent the wall accessible to persons in front of the range 22. The valve 26 defines an internally threaded receptacle 42 by which it can be screwed to the connector 20, a street elbow, a pipe nipple, or the like. The shut-off valve 26 is typically oriented so that the axis of the receptacle 42 extends vertically downwardly parallel to the wall (as illustrated in FIG. 2) or horizontally parallel to the wall. The valve handle 44 is located on one side of vertically oriented valves and on the top side of horizontal valves to assure accessibility to the user.

The connector 20 delivers gas to the range 22 and is so constructed and arranged that it facilitates moving the range for cleaning, maintenance and inspection without disconnecting the range from the supply line. The connector 20 comprises a hose assembly 50 and first and second swivel fittings 52, 54 at respective opposite hose assembly ends for connection to the supply line and to the range 22.

The hose assembly 50 preferably comprises a composite hose 56, fittings 58 attached at the hose ends and an optional quick disconnect coupling 60 for detaching the range 22 from the hose without shutting off the gas supply.

The composite hose 56 may be of conventional construction. The preferred hose 56 comprises a thin walled, stainless steel annularly or helically corrugated hose member, a braided stainless steel wire reinforcing sheath for the hose member and a relatively thick seamless plastic shroud. The shroud hermetically encapsulates the hose member, the sheath, and the junctures of the hose member and the fittings 58. The composite hose construction is stiffly resilient when flexed for range repositioning yet provides strength, toughness and gas impermeability.

The ends of the metal hose member and the sheath are welded to the fittings 58. Each fitting 58 terminates in an externally threaded projecting nipple constructed to be hermetically joined to an internally threaded member. The illustrated fittings 58 are stainless steel, but may be constructed from any suitable material.

The quick disconnect coupling 60 is illustrated as installed in the connector 20 near the range 22 so that the range can be disconnected from the gas supply pipe 40 without closing the manual shut-off valve 26. The illustrated coupling 60 comprises a female coupling unit 64 and a male coupling unit 66. The unit 64 is connected to a hose fitting 58 at the hose end nearest the range 22 while the unit 66 is connected to the swivel fitting 54 at the range 22. The female unit 64 contains a valve mechanism which automatically closes when the male and female units are detached so gas can not escape when the range is disconnected from the supply line via the coupling 60. The male unit 66 actuates the valve mechanism to open communication between the supply line and the range when the units 64, 66 are coupled.

The coupling 60 is conventionally constructed and as such incorporates a detent mechanism and seal for detachably coupling the units 64, 66 together in a sealed relationship. The detent mechanism permits relative rotation between the male unit 66 and the female unit 64 without interrupting the seal. When the range is moved from one position to another the connector 20 flexes or straightens and the units 64, 66 rotate relative to each other. This relative motion precludes creation of twisting stresses in the hose assembly by the range movement. As noted, the coupling 60 is an optional feature of the connector 20. Where the coupling 60 is not used, the hose assembly may have a slight tendency to twist on itself when in its flexed condition because of stresses; but these stresses are not so great that any structural damage occurs.

Figure 5:
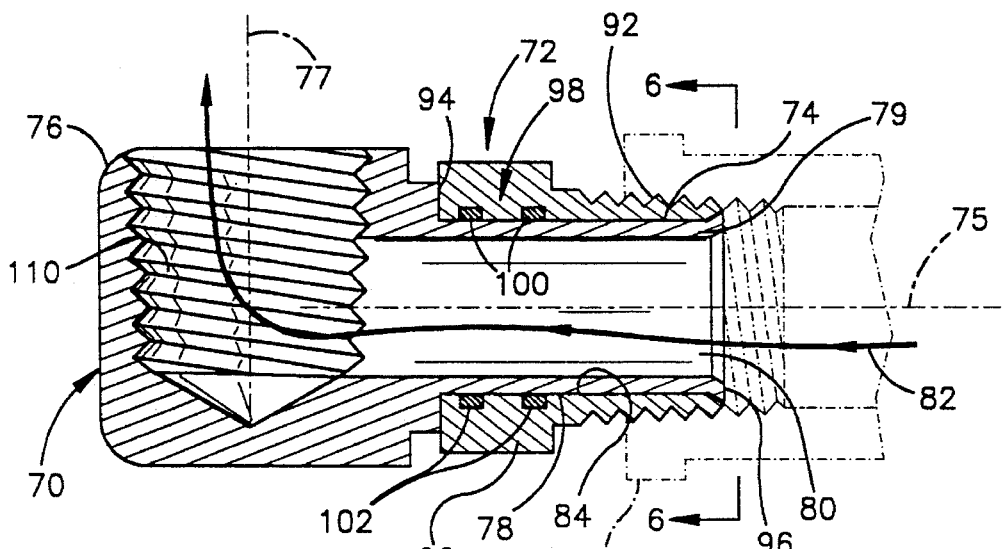
FIG. 5 is an elevational view of a swivel fitting shown in FIG. 2 constructed according to the invention with parts broken away and shown in cross section.
Figure 6:
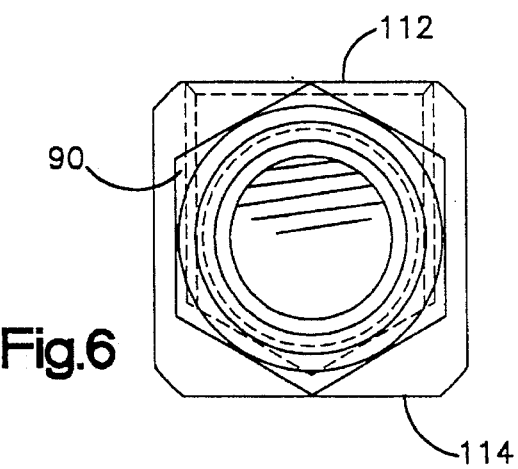
FIG. 6 is a view seen approximately from the plane of the line 6—6 of FIG. 5.

The swivel fitting 52 connects the hose assembly 50 to the supply line 24 so that the hose assembly end adjacent the supply line swivels relative to the supply line when the hose flexes and straightens during range movement. The swivel fitting 52 is illustrated in detail in FIGS. 5 and 6 as comprising a body 70 and a swivel member 72 carried by the body 70. The illustrated and preferred body 70 is elongated and defines a first body end 74, proximal the supply line, associated with the swivel member 72. The body end 74 projects toward the supply line along a longitudinal body axis 75. A second, opposite body end 76 is located proximal, and connected to, the hose assembly. The hose assembly joins the body 70 along a second axis 77 extending transverse to the axis 75. As illustrated, the axes 75, 77 are normal to each other and intersect.

The first body end 74 defines an opening 80 surrounding a gas flow path 82 extending from the supply pipe 40 through the fitting 52 to the hose assembly. The swivel member 72 likewise defines an opening 84 surrounding the gas flow path 82. The swivel member 72 and the first body end 74 are sealingly engaged and relatively rotatable with respect to each other about the axis 75. The axis 75 extends centrally through the openings 80, 84 and along the gas flow path 82.

The illustrated first body end 74 is a tubular, cylindrical body wall centered on the axis 75. The gas flow path 82 is defined in part by the inner wall face. The swivel member 72 rides on the outer cylindrical wall surface 78 and is maintained in position by a radially outwardly flared body terminus 79.

The swivel member 72 is tubular and defines a nut-like body portion 90, a projecting cylindrical threaded portion 92 projecting from the body portion toward the supply line, and a smooth cylindrical bore extending through the member 72 and centered on the axis 75. The body portion 90 is relatively thick in its radial dimension and its exterior forms wrench flats. The wrench flats facilitate screwing the threaded swivel member portion 92 into the valve receptacle 44 with adequate torque to assure a hermetic union.

The swivel member body portion 90 seats against an axially facing shoulder 94 formed on the body 70. The projecting threaded portion 82 defines an outwardly diverging frusto-conical chamfer surface 96 at its terminus. The surface 96 confronts the outwardly flared body terminus 79 to retain the swivel member 72 in axial alignment with the body 70.

A seal assembly 98 between the swivel member and the cylindrical outer surface of the body end 74 enables relative rotation without leakage. The seal assembly comprises O-rings 100 disposed in respective grooves 102 in the interior wall of the nut-like body portion 90. The grooves 102 do not materially weaken the body portion 90 because its radial thickness is relatively great. The O-rings are compressed in the grooves and resiliently engage the body end 74 to seal the juncture of the body 70 and the swivel member 72 while enabling relative rotation.

The second body end 76 is illustrated as having a square or rectilinear cross sectional shape (FIG. 6) so its sides are flat panel-like faces as is its end. A tapped hole 110 extends into the body end 76 on the axis 77 through one side face 112 to form a receptacle. The flat panel-like body faces facilitate gripping the body while screwing the hose assembly into the receptacle 110.

The hole, or receptacle, 110 extends into the body 70 beyond the axis 75. The gas flow path 82 makes a turn passing through the swivel fitting 52. A hose fitting 58 is hermetically screwed into the receptacle 110 so that the hose assembly end attached to the fitting 52 is rotatable in a plane transverse to the axis 75 when the range moves. The hose assembly end thus moves in a tight arc about the swivel axis 75.

When the connector 20 is attached to the supply line as described, the axes 75, 77 can not align in such a way that the swivel fitting 52 locks up, does not rotate and kinks the hose when the range is moved away from the wall. Moreover, the distance between the axis 77 and the remote end of the swivel member 72 is relatively small, i.e. less than two hose assembly diameters. In the event the range 22 is pulled from the wall to the limit of the connector length, bending moments exerted on the fitting 52 by the applied connector pulling force are minimized and less than the bending moments experienced by prior art multi-axis swivel devices.

The swivel fitting 54 is constructed identically to the fitting 52. The fitting 54 is screwed into the regulator 31 at the range and the male quick disconnect coupling member 66 is screwed into the body receptacle 110. See FIGS. 2–4. The axis 75 of the swivel fitting 54 is horizontal so the hose assembly end attached to the fitting 54 rotates in a vertical plane about the axis 75.

When the range is in its operational position adjacent the wall (FIG. 3), the hose assembly 50 extends horizontally from the swivel fitting 52 substantially parallel to the wall while the hose assembly end at the fitting 54 extends downwardly from the range gas inlet. The hose body flexes in that it droops somewhat and curves between the ends. The connector length is sufficiently short that the hose 56 does not contact the floor when it flexes. Put another way, the sum of the distance from the floor to the regulator receptacle and the distance from the floor to the valve receptacle 44 is greater than the length of the connector 20.

The orientation of the hose assembly ends and the fittings 52, 54 illustrated by FIGS. 2 and 3 is particularly desirable when the shut off valve 26 and the range inlet line 30 are located at substantially different vertical distances from the floor and/or are distanced substantially apart horizontally. The horizontal separation between the range inlet and the shut off valve is compensated by the fitting 52 which swivels about a vertical axis as the range is moved away from the wall to align its hose assembly end with the swivel fitting 54. Vertical separation between the valve and the inlet line is compensated by the fitting 54 swiveling about a horizontal axis to align its end of the hose assembly with the fitting 52.

As the range is returned to its operating position (FIG. 3) the fitting 54 initially swivels as the hose droops and flexes under the influence of gravity. Slight hose twisting and horizontal separation between the inlet and supply lines creates sufficient torque to swivel the fitting 52 to its position illustrated by FIG. 3.

Because the receptacle 110 extends beyond the swivel fitting axis 75 the hose assembly end screwed into the receptacle 110 is located close to the body face 114 opposite the face 112. Flexible connectors are subject to regulations governing their overall lengths. Generally speaking, permissible connector lengths are relatively short. Because the composite hose constructions are inherently stiff, resistance to flexing increases as the length of the hose is reduced. Any given length connector should exhibit optimum flexibility. Connector flexibility is enhanced by maximizing the proportion of the connector length attributable to hose.

The overall length of the connector 20 is determined by straightening the connector to full length and measuring the distance between the body faces 114 of the swivel fittings 52, 54. The faces 114 are each quite close to a respective hose assembly end and the swivel fitting body dimensions between the body faces 112, 114 are less than about 50 mm. The compact construction of the fittings 52, 54 thus contributes to maximizing hose length. In the illustrated connector 20 each face 114 is much less than 50 mm from the adjacent hose assembly end.

Figure 7:
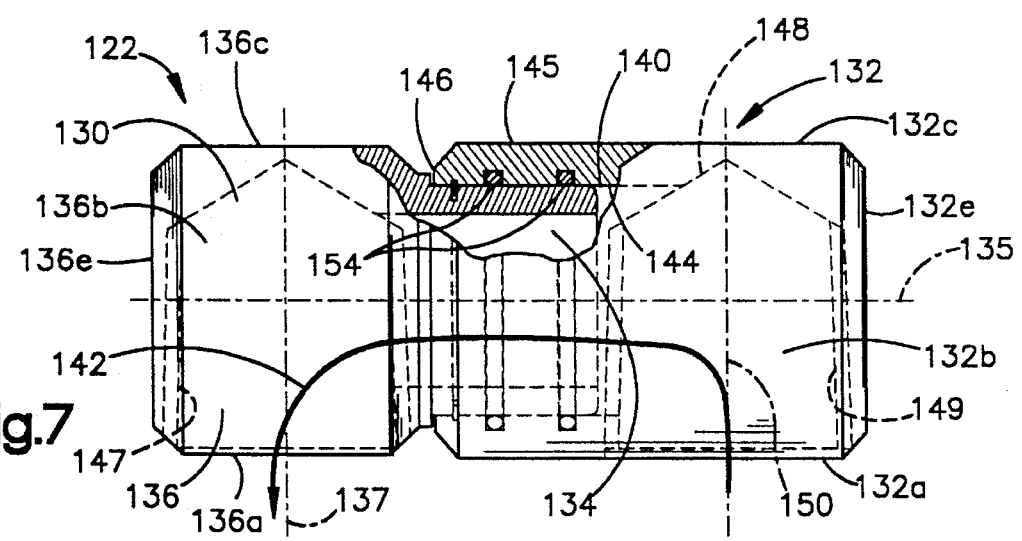
FIG. 7 is an elevational view of a modified swivel fitting constructed according to the invention with parts broken away and shown in cross section.
Figure 8:
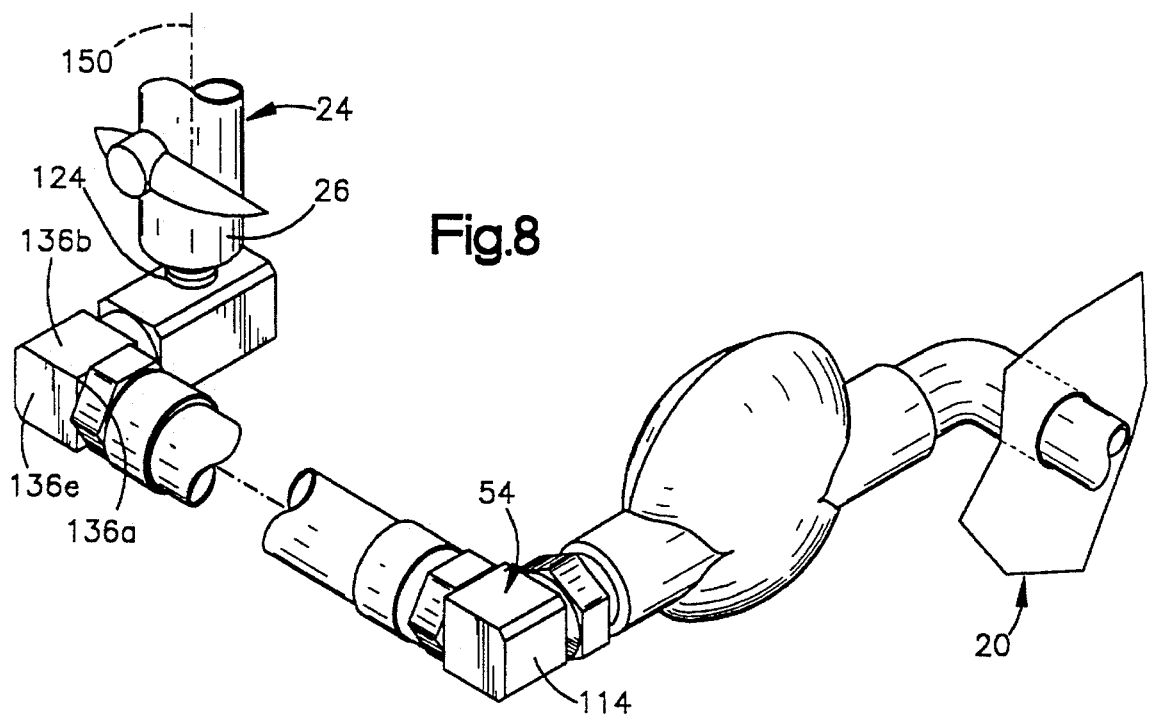
FIG. 8 is a fragmentary elevational view of a modified connector installed for delivering gas to a range in its normal operating location.
Figure 9:
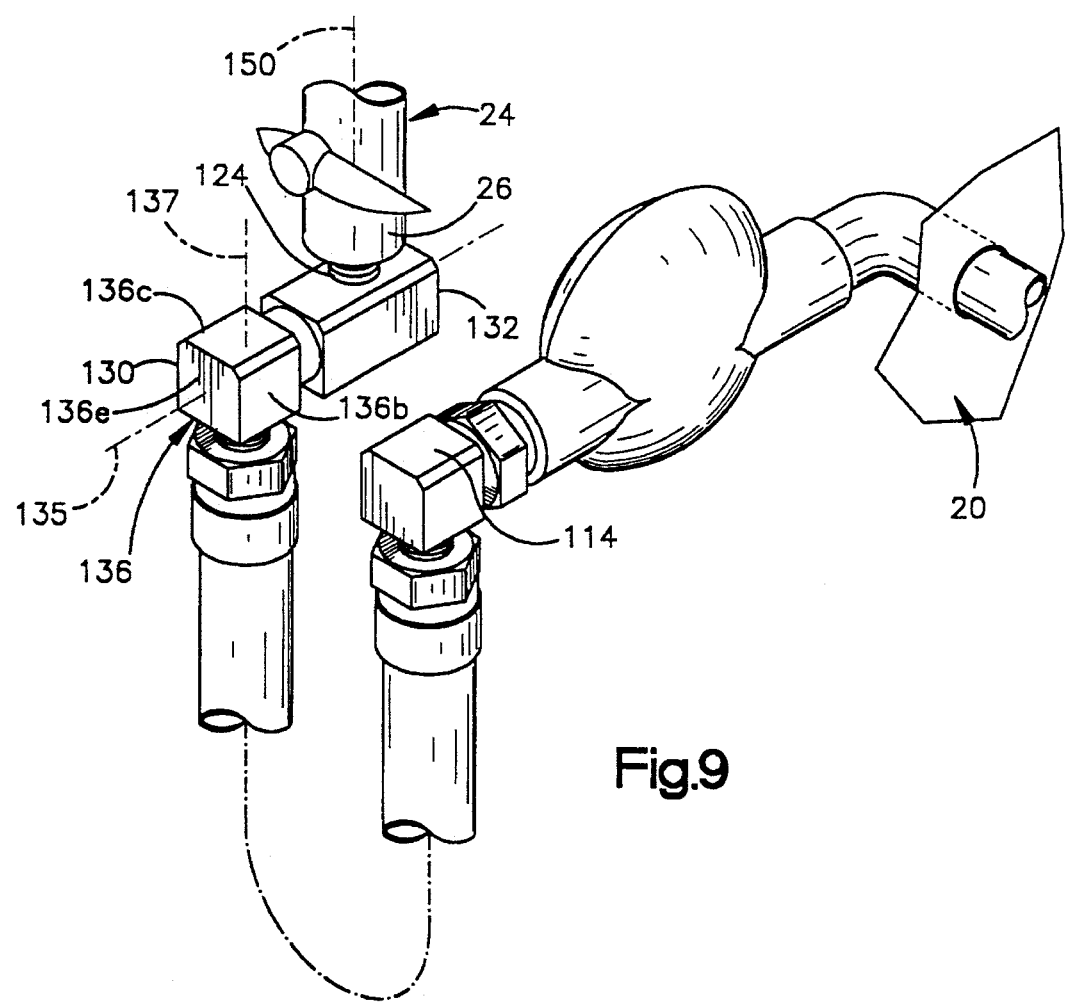
FIG. 9 is a view similar to FIG. 8 with the range moved to a cleaning location.

An alternative connector 120 is illustrated by FIGS. 7–9 of the drawings. The connector 120 extends between the supply line 24 and the range 20 and is in all material respects constructed like the connector 20 except for the swivel fitting 122 connected to the supply line. The range 20 is the same as the range of FIGS. 2 et seq. as is the supply line 24. The shut-off valve 26 is equipped with a short pipe nipple 124 connecting the fitting 122 to the valve. The illustrated connector 120 does not include a quick disconnect coupling 60.

The swivel 122 is constructed and arranged to swivel about a horizontal axis 135 (FIGS. 8 and 9) as the range moves between its operating and cleaning positions. In the operating position (FIG. 9) the flexed connector 120 droops between the wall and range. The hose ends are each oriented to extend vertically downwardly by their respective swivel fittings. When the range moves toward its cleaning position (FIG. 8) each fitting 122, 54 swivels about its horizontal axis as the connector straightens. The connector ends swivel in vertical planes about their respective swivel axes when the range moves.

The swivel fitting 122 itself is best illustrated by FIG. 7 as comprising a fitting body 130 and a swivel member 132 carried by the body 130. The illustrated and preferred body 130 is elongated and defines a first body end 134 associated with the swivel member 132 and proximal the supply line. The body end 134 projects toward the supply line along the longitudinal body axis 135. A second, opposite body end 136 is located proximal and connected to the hose assembly. The hose assembly joins the body 130 along a second axis 137 extending transverse to the axis 135. As illustrated, the axes 135, 137 are normal to each other and intersect.

The first body end 134 defines an opening 140 surrounding a gas flow path 142 extending from the supply line through the fitting 122. The swivel member 132 likewise defines an opening 144 surrounding the gas flow path 142. The swivel member and the first body end 134 are sealingly engaged and relatively rotatable with respect to each other about the axis 135 which extends through the openings 140, 144 and the gas flow path 142.

The illustrated first body end 134 is a tubular, smooth cylindrical body extension centered on the axis 135. The gas flow path 142 is defined in part by the inner wall of the body extension. The swivel member 132 rides on the outer cylindrical body extension wall surface 145. The second body end 136 has a rectilinear or square cross sectional shape defined by flat body panels, or faces, 136a–d and a flat panel-like end face 136e. A tapped hole 147 extends into the body end 136 on the axis 137 through one side face 136a to form a hose fitting receptacle. The flat panel-like body faces facilitate manually gripping the body while screwing the hose assembly into the receptacle.

The hole, or receptacle, 147 extends into the body 70 beyond the axis 135. The hose fitting 58 is hermetically screwed into the receptacle 147 so that the hose assembly end attached to the fitting 122 is rotatable in a plane transverse to the axis 135 when the range moves.

The swivel member 132 is tubular and has a square or rectilinear cross sectional shape forming flat panel-like body faces 132a–d and a flat panel-like end face 132e. The swivel member defines an axially extending cylindrical bore 148 surrounding the body end 134 on the axis 135 and terminating short of the end face 132e. A tapped hole, or receptacle, 149 extends through the body face 132a along an axis 150 transverse to and intersecting the axis 135.

The pipe nipple 124 is hermetically threaded into the receptacle 149 and tightened so the swivel fitting 122 is fixed to the nipple 124 with the axis 135 extending parallel to the wall. The axes 150 and 137 are disposed in parallel planes.

The swivel member 132 and the body 130 are maintained assembled together, yet free to rotate with respect to each other, by a snap ring 146 disposed in axially aligned ring grooves in the swivel member bore 148 and the body surface 145. The juncture of the body 130 and swivel member 132 is sealed by axially spaced O-rings 154 which are resiliently compressed into ring grooves in the bore 148 and sealingly engage the body surface 145.

Figure 10:
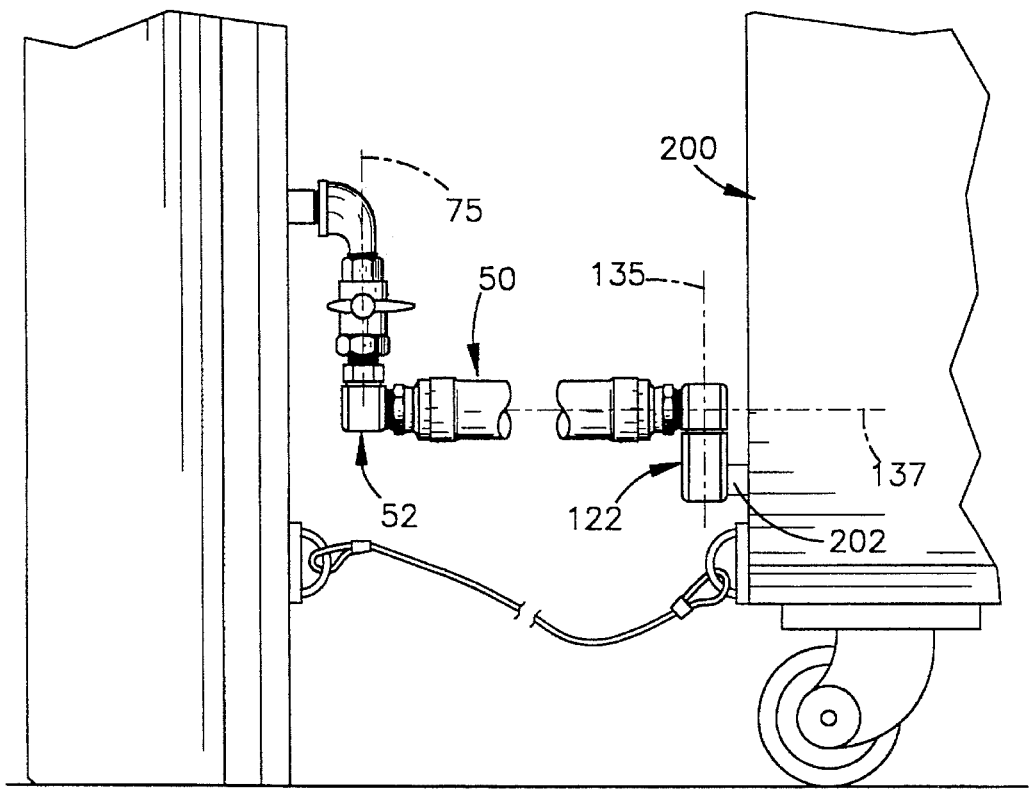
FIG. 10 is a fragmentary elevational view of another modified connector installed for delivering gas to a commercial fryer in its normal operating location; and, FIG. 11 is a view similar to FIG. 10 with the fryer moved to its cleaning location.
Figure 11:
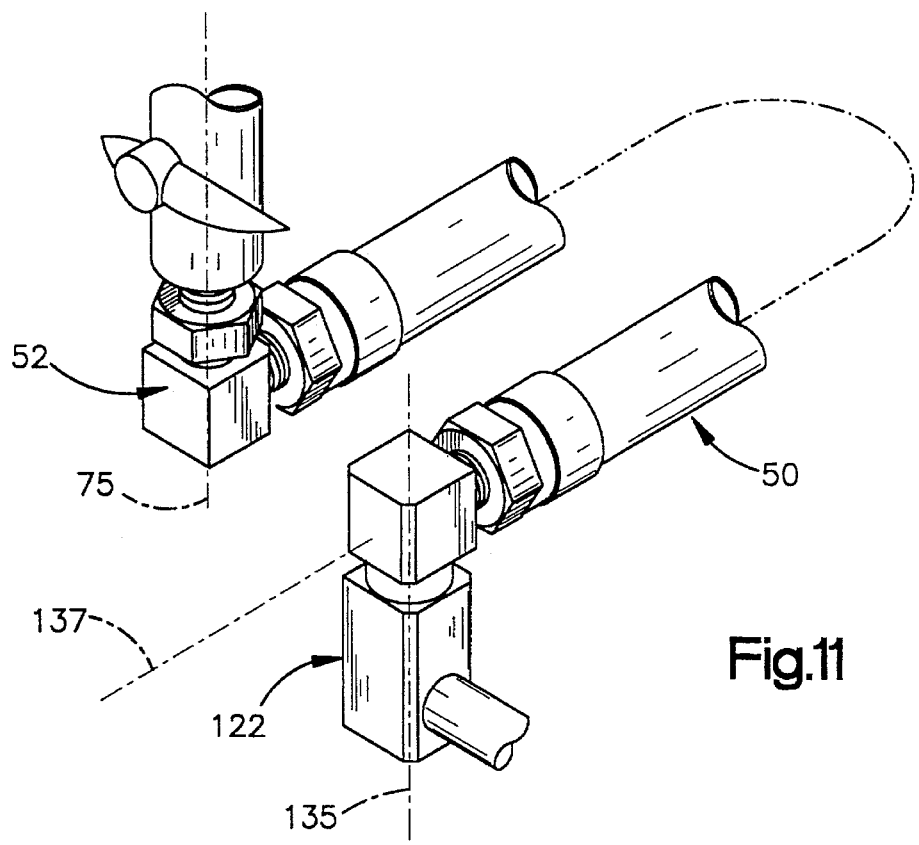

FIGS. 10 and 11 illustrate a commercial fryer 200 coupled to the gas supply line via a connector 220. The fryer 200 may be of any conventional or suitable construction and is not, therefore, described in detail. The illustrated fryer 200 is somewhat typical of this type of appliance in that a gas inlet pipe 202 projects from the back of the fryer toward the wall at a location close to the floor. In this environment a connector which droops downwardly from its ends when the appliance moves toward its operative position can engage the floor which is undesirable. When a connector engages the floor it can impede appliance movement as well as becoming fouled by foreign materials from the floor. The new connector 220 couples the fryer to the supply line without drooping toward the floor.

The connector 220 employs a swivel fitting 52 connected to the supply line (as described above in reference to FIGS. 2–6), a swivel fitting 122 (constructed as described in reference to FIGS. 7–9) connected to the fryer, and a hose assembly 50 extending between the swivel fittings. The swivel fitting 122 is screwed onto the fryer inlet pipe so that the hose assembly end attached to the fitting 122 and disposed on the axis 137 rotates in a horizontal plane about the axis 135.

When the fryer 200 is moved to its operating position adjacent the wall the hose assembly flexes and the swivel fittings 52, 122 pivot the hose assembly ends about the vertical axes 75, 135, respectively. The hose assembly flexes essentially horizontally because the fittings 52, 122 maintain the hose assembly end regions horizontally oriented. The stiffly resilient nature of the hose assembly results in the central flexed region of the hose assembly remaining essentially in a horizontal orientation rather than drooping downwardly to the floor.

It should be noted that, if desired, the swivel fitting 122 can be replaced by the combination of a swivel fitting 52 (or 54) and a pipe elbow (not illustrated). In such an arrangement, connected to the fryer 200 for example, the pipe elbow is threaded onto the fryer inlet pipe 202. The free pipe elbow end extends vertically upwardly. The fitting 52 is threaded onto the free end so that the axis 75 is vertical.

While preferred embodiments of the invention have been illustrated and described in detail, the present invention is not to be considered limited to the precise constructions disclosed. Various adaptations, modifications and uses of the invention may occur to those skilled in the art to which the invention relates and the intention is to cover hereby all such adaptations, modifications and uses which fall within the spirit or scope of the appended claims.

Having described my invention I claim:

1. A connector for delivering combustion gas to a gas fired appliance from a stationary supply line, the appliance being movable toward and away from the supply line with the connector between them, said connector comprising:

a hose assembly and first and second swivel fittings connected at respective ends of the hose assembly;

said first swivel fitting connected to the supply line and comprising a body and a swivel member, said body having a first body end proximal the supply line and a second body end proximal and connected to one end of the hose assembly;

said first body end defining an opening surrounding a gas flow path, said swivel member defining an opening surrounding said gas flow path, said swivel member and said first body end sealingly engaged and relatively rotatable with respect to each other about a first axis extending through said openings and said gas flow path, said swivel member projecting from said first body end for receiving gas from said supply line;

said second body end confronting said hose assembly and defining an opening surrounding said gas flow path for delivering gas to said hose assembly and a second axis extending through said second body end opening, said second axis extending transverse to said first axis so that said second axis is rotatable in a plane extending transverse to said first axis;

said second swivel fitting connected to the appliance and comprising a second body and a second swivel member, said second body having a first body end proximal the appliance and a second body end proximal to the other end of the hose assembly;

said first end of said second body defining an opening surrounding a gas flow path, said second swivel member defining an opening surrounding said gas flow path, said second swivel member and said first end of said second body sealingly engaged and relatively rotatable with respect to each other about a third axis extending through said openings and said gas flow path, said swivel member projecting from said first end of said second body for delivering gas to said appliance;

said second end of said second body confronting said hose assembly and defining an opening surrounding said gas flow path and a fourth axis extending through said second end opening of said second body, said fourth axis extending transverse to said third axis so that said fourth axis is rotatable in a plane extending transverse to said third axis;

said hose assembly comprising a flexible metal hose member and first and second end fittings respectively forming said opposite ends of said hose assembly, said first and second end fittings respectively connected to said second ends of said first and second bodies said second body end opening and said first hose assembly end fitting detachably joined in fluid tight relationship about said second axis, and said second end opening of said second body and the second hose assembly end fitting detachably joined in fluid tight relationship about said fourth axis;

said first and second swivel members enabling rotation of said first and second bodies about said first and third axes so that as the appliance is moved substantially to the limit of its travel away from the gas supply line the ends of said hose assembly tend to align.

2. The connector claimed in claim 1 wherein one of said end fittings comprises a quick-disconnect fitting having a male connecting unit and a female connecting unit, one of said connecting units housing a flow valve which is closed when said connecting units are disengaged, said flow valve open and said connecting units relatively rotatable when said units are engaged, one of said connecting units attached to and coaxial with a second end of one of said first and second swivel fitting bodies whereby said one end of said hose member is rotatable about the axis of said second end of said one of said first and second swivel bodies.

3. The connector claimed in claim 1 wherein one of said first and second swivel members comprises a wall extending about said gas flow path and projecting toward said swivel member opening, said projecting wall confronting a substantially parallel wall of the associated first end of said first or second body, said one of said first or second swivel members further comprising a swivel member end remote from said projecting wall defining a swivel body end opening extending about the gas flow path and about a fifth axis, said fifth axis extending transverse to the axis extending through said confronting walls.

4. The connector claimed in claim 1 wherein one of said first and second swivel members comprises a wall extending about said gas flow path and projecting toward said swivel member opening, said projecting wall confronting a substantially parallel wall of the associated first end of said first or second body, said one of said first or second swivel members further comprising a swivel member end remote from said projecting wall defining a swivel body end opening extending about the gas flow path and about a fifth axis, said fifth axis extending transverse to the axis extending through said confronting walls.

5. A connector for delivering combustion gas to a gas fired appliance from a stationary supply line, the appliance being movable toward and away from the supply line with the connector straightening and flexing between them as the appliance moves, said connector comprising:

a hose assembly and first and second swivel fittings at respective ends of the hose assembly;

said first swivel fitting connected to the supply line and comprising a body and a swivel member, said body having a first body end proximal the supply line and a second body end proximal and connected to one end of the hose assembly;

said first body end defining an opening surrounding a gas flow path, said swivel member defining an opening surrounding said gas flow path, said swivel member and said first body end sealingly engaged and relatively rotatable with respect to each other about a first axis extending through said openings and said gas flow path, said swivel member projecting from said first body end for receiving gas from said supply line;

said second body end extending toward said hose assembly and defining an opening surrounding said gas flow path for delivering gas to said hose assembly and a second axis extending through said second body end opening, said second axis extending transverse to said first axis so that said second axis is rotatable in a plane extending transverse to said first axis;

said second swivel fitting connected to the appliance and comprising a second body and a second swivel member, said second body having a first body end proximal the appliance and a second body end proximal to the other end of the hose assembly;

said first end of said second body defining an opening surrounding a gas flow path, said second swivel member defining an opening surrounding said gas flow path, said second swivel member and said first end of said second body sealingly engaged and relatively rotatable with respect to each other about a third axis extending through said openings and said gas flow path, said swivel member projecting from said first end of said second body for delivering gas to said appliance;

said second end of said second body extending toward connection with said hose assembly and defining an opening surrounding said gas flow path and a fourth axis extending through said second end opening of said second body, said fourth axis extending transverse to said third axis so that said fourth axis is rotatable in a plane extending traverse to said third axis;

said hose assembly comprising a flexible metal hose member and first and second end fittings respectively fixed to opposite ends of said hose member said first end fitting detachably connected to said second end of said first body about said second axis and said second end fitting detachably secured to said second end of said second body about said fourth axis;

one of said first or third axes disposed in a generally horizontal plane and said respective associated second or fourth axis rotatable in a generally vertical plane.

6. The connector claimed in claim 5 wherein said first swivel fitting is connected to said supply line a first distance from the floor and said second swivel fitting is connected to said appliance a second distance from the floor, said first and second distances aggregating less than the length of said connector, said second and fourth axes extending generally parallel to each other when said appliance is proximate said supply line, with said hose assembly forming a flexed U-like shape extending generally horizontally from said swivel fittings.

7. A connector for delivering combustion gas to a gas fired appliance from a stationary supply line, the appliance being movable toward and away from the supply line with the connector straightening and flexing between them as the appliance moves, said connector comprising:

a flexible hose assembly and first and second swivel fittings at respective ends of the hose assembly;

said first and second swivel fittings having respective wall portions defining between them the maximum overall connector length when said hose assembly extends substantially straight between said swivel fittings;

each of said swivel fittings comprising a swivel member attached to said appliance or said supply line, said swivel members each defining a gas flow path and having a swivel axis extending therethrough, each swivel axis extending parallel to a respective adjacent swivel fitting wall portion, with each wall portion rotatable relative to said swivel member about said axis, the axis of said hose assembly extending in direction transverse to said swivel axes and through said wall portions when said hose assembly is straightened between said swivel fittings.

8. A method of repositioning a commercial gas fired appliance between an operating position adjacent a gas supply line and an alternate position spaced from the supply line without disconnecting the appliance from the supply line comprising:

constructing a flexible gas connector comprising attaching first and second swivel connector end fittings to opposite ends of a flexible hose assembly and connecting said gas connector between the appliance and the supply line comprising;

i. hermetically joining a first connector end fitting to said supply line for swivelling movement about a horizontal axis extending through the juncture of said first connector end and said supply line with the associated hose assembly end attached to said end fitting for rotation about said axis in a generally vertical plane;

ii. hermetically joining a second connector end fitting to said appliance for swivelling movement about a second horizontal axis extending through the juncture of said second connector end and said appliance with the associated hose assembly end attached to said end fitting for rotation about said second axis in a generally vertical plane;

positioning said appliance proximal said supply line comprising flexing said gas connector and suspending said hose assembly between said appliance and said supply line, swivelling said first connector end fitting about said first horizontal axis to a position wherein said hose assembly end extends substantially vertically downward away from said supply line, and swivelling said second connector end fitting about said second horizontal axis to a position wherein said hose assembly extends substantially vertically downward away from said appliance; and moving said appliance away from said supply line comprising straightening said hose assembly from said flexed condition, swivelling said first connector end fitting about said first horizontal axis to a position wherein said hose assembly end extends in a direction toward said appliance, and swivelling said second connector end fitting about said second horizontal axis to a position wherein said hose assembly end extends in a direction toward said supply line.

9. A connector for delivering combustion gas to a gas fired appliance from a stationary supply line, the appliance being movable toward and away from the supply line with the connector between them, said connector comprising:

a hose assembly and first and second swivel fittings connected at respective ends of the hose assembly;

said first swivel fitting connected to the supply line and comprising a body and a swivel member, said body having a first body end proximal the supply line and a second body end proximal and connected to one end of the hose assembly;

said first body end defining an opening surrounding a gas flow path, said swivel member defining an opening surrounding said gas flow path, said swivel member and said first body end sealingly engaged and relatively rotatable with respect to each other about a first axis extending through said openings and said gas flow path, said swivel member projecting from said first body end for receiving gas from said supply line;

said second body end confronting said hose assembly and defining an opening surrounding said gas flow path for delivering gas to said hose assembly and a second axis extending through said second body end opening, said second axis extending transverse to said first axis so that said second axis is rotatable in a plane extending transverse to said first axis;

said second swivel fitting connected to the appliance and comprising a second body and a second swivel member, said second body having a first body end proximal the appliance and a second body end proximal to the other end of the hose assembly;

said first end of said second body defining an opening surrounding a gas flow path, said second swivel member defining an opening surrounding said gas flow path, said second swivel member and said first end of said second body sealingly engaged and relatively rotatable with respect to each other about a third axis extending through said openings and said gas flow path, said swivel member projecting from said first end of said second body for delivering gas to said appliance;

said second end of said second body confronting said hose assembly and defining an opening surrounding said gas flow path and a fourth axis extending through said second end opening of said second body, said fourth axis extending transverse to said third axis so that said fourth axis is rotatable in a plane extending transverse to said third axis;

said hose assembly comprising a flexible metal hose member and first and second end fittings respectively forming opposite ends of said hose assembly said first and second end fittings respectively connected to said second ends of said first and second bodies;

said first and second swivel members enabling rotation of said first and second bodies about said first and third axes so that as the appliance is moved substantially to the limit of its travel away from the gas supply line the ends of said hose assembly tend to align;

one of said first and second swivel members comprising a wall extending about said gas flow path and projecting toward said swivel member opening, said projecting wall confronting a substantially parallel wall of the associated first end of said first or second body, said one of said first or second swivel members further comprising a swivel member end remote from said projecting wall defining a swivel body end opening extending about the gas flow path and about a fifth axis, said fifth axis extending transverse to the axis extending through said confronting walls.

10. The connector claimed in claim 9 wherein said confronting walls are substantially cylindrical and further comprising seal means disposed between said walls for blocking the egress of gas from said swivel fitting.

11. A connector for delivering combustion gas to a gas fired appliance from a stationary supply line, the appliance being movable toward and away from the supply line with the connector between them, said connector comprising:

a hose assembly and first and second swivel fittings connected at respective ends of the hose assembly;

said first swivel fitting connected to the supply line and comprising a body and a swivel member, said body having a first body end proximal the supply line and a second body end proximal and connected to one end of the hose assembly;

said first body end defining an opening surrounding a gas flow path, said swivel member defining an opening surrounding said gas flow path, said swivel member and said first body end sealingly engaged and relatively rotatable with respect to each other about a first axis extending through said openings and said gas flow path, said swivel member projecting from said first body end for receiving gas from said supply line;

said second body end confronting said hose assembly and defining an opening surrounding said gas flow path for delivering gas to said hose assembly and a second axis extending through said second body end opening, said second axis extending transverse to said first axis so that said second axis is rotatable in a plane extending transverse to said first axis;

said second swivel fitting connected to the appliance and comprising a second body and a second swivel member, said second body having a first body end proximal the appliance and a second body end proximal to the other end of the hose assembly;

said first end of said second body defining an opening surrounding a gas flow path, said second swivel member defining an opening surrounding said gas flow path, said second swivel member and said first end of said second body sealingly engaged and relatively rotatable with respect to each other about a third axis extending through said openings and said gas flow path, said swivel member projecting from said first end of said second body for delivering gas to said appliance;

said second end of said second body confronting said hose assembly and defining an opening surrounding said gas flow path and a fourth axis extending through said second end opening of said second body, said fourth axis extending transverse to said third axis so that said fourth axis is rotatable in a plane extending transverse to said third axis;

said hose assembly comprising a flexible metal hose member and first and second end fittings respectively forming said opposite ends of said hose assembly, said first and second end fittings respectively connected to said second ends of said first and second bodies;

said first and second swivel members enabling rotation of said first and second bodies about said first and third axes so that as the appliance is moved substantially to the limit of its travel away from the gas supply line the ends of said hose assembly tend to align;

one of said first and second swivel members comprising a wall extending about said gas flow path and projecting toward said swivel member opening, said projecting wall confronting a substantially parallel wall of the associated first end of said first or second body, said one of said first or second swivel members further comprising a swivel member end remote from said projecting wall defining a swivel body end opening extending about the gas flow path and about a fifth axis, said fifth axis extending transverse to the axis extending through said confronting walls.

* * * * *